United States Patent
Reisinger et al.

(10) Patent No.: US 10,313,033 B2
(45) Date of Patent: Jun. 4, 2019

(54) KEY LOCATION SYSTEM

(71) Applicant: Continental Automotive GmbH, Hannover (DE)

(72) Inventors: Thomas Reisinger, Regenstauf (DE); Thomas Georgi, Regensburg (DE); Stefan Hammes, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 106 days.

(21) Appl. No.: 15/247,563

(22) Filed: Aug. 25, 2016

(65) Prior Publication Data

US 2017/0063477 A1 Mar. 2, 2017

(30) Foreign Application Priority Data

Aug. 26, 2015 (DE) .......................... 10 2015 216 331

(51) Int. Cl.
H04B 17/30 (2015.01)
H04B 17/27 (2015.01)
G01S 5/06 (2006.01)

(52) U.S. Cl.
CPC .............. H04B 17/30 (2015.01); G01S 5/06 (2013.01); H04B 17/27 (2015.01)

(58) Field of Classification Search
CPC ............ H04B 17/30; H04B 17/27; G01S 5/06
See application file for complete search history.

(56) References Cited

U.S. PATENT DOCUMENTS

2006/0094350 A1* 5/2006 Ishimura ................ B60R 25/24
455/9
2007/0200759 A1* 8/2007 Heidari-Bateni ..... G01S 13/767
342/387
2009/0206989 A1* 8/2009 Leitch .................... B60R 25/24
340/5.61
2009/0224876 A1* 9/2009 McCall ............... B60R 25/2009
340/5.61
2012/0221189 A1* 8/2012 Konet .................. G01C 22/006
701/29.1
2014/0330449 A1 11/2014 Oman et al. .................... 701/2

FOREIGN PATENT DOCUMENTS

| DE | 10032936 A1 | 2/2002 | ............ B60R 25/24 |
| DE | 102012201385 A1 | 8/2013 | ............ B60R 25/00 |
| WO | 2001/25571 A1 | 4/2001 | ............ G06C 9/00 |
| WO | 2012/076389 A1 | 6/2012 | ............ B60R 25/24 |

OTHER PUBLICATIONS

German Office Action, Application No. 102015216331.8, 7 pages, dated Jun. 28, 2016.

* cited by examiner

*Primary Examiner* — Jianye Wu
(74) *Attorney, Agent, or Firm* — Slayden Grubert Beard PLLC

(57) ABSTRACT

The present disclosure relates to a method and devices for transit-time-based distance measurement and the teachings may be applied to locating keys for a motor vehicle. In one embodiment, a system for detecting the distance between a vehicle and an associated key may include: a transceiver associated with a vehicle; a key for the motor vehicle; and a processor configured to determine an estimated signal transit time between the transceiver and the key based at least in part on a ratio of a length of two time intervals between the transmission or reception of a message between the transceiver and the key.

16 Claims, 11 Drawing Sheets

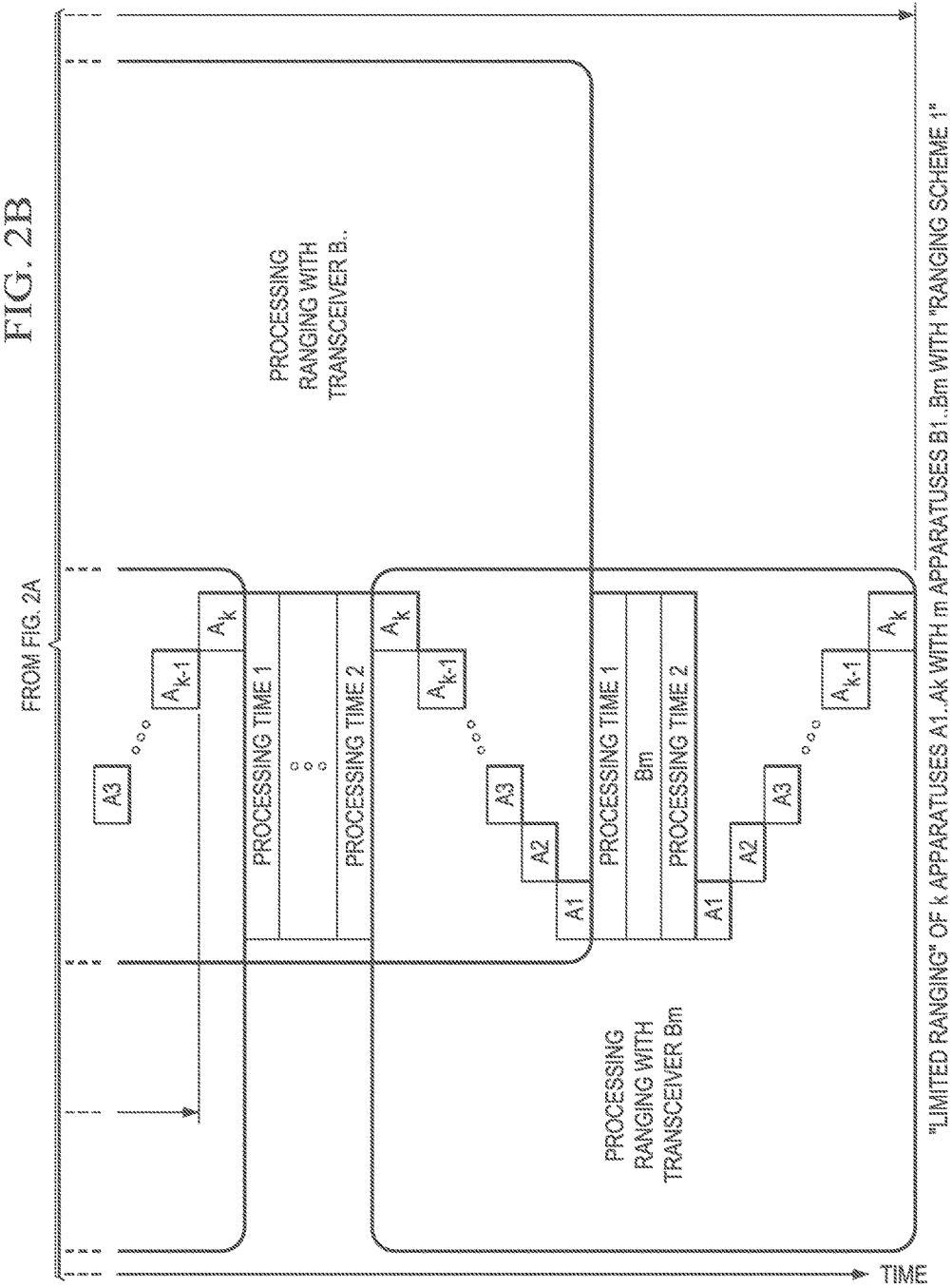

KEY LOCATION SYSTEM

CROSS-REFERENCE TO RELATED APPLICATIONS

This application claims priority to DE Application No. 10 2015 216 331.8 filed Aug. 26, 2015, the contents of which are hereby incorporated by reference in their entirety.

TECHNICAL FIELD

The present disclosure relates to a method and devices for transit-time-based distance measurement and the teachings may be applied to locating keys for a motor vehicle.

BACKGROUND

There are per se already a number of approaches for determining the location of a key for a motor vehicle, such as, for example in DE 100 32 936 A1, DE 10 2012 2013 85 A1, WO 2012/076389 A1.

SUMMARY

Teachings of the present disclosure may be embodied in a location-determining device for a key for, in particular, a motor vehicle.

In some embodiments, a distance-determining device may include at least one vehicle-side component in the form of a transceiver (B1, B2, B3) and at least one further component in the form of a key (A; A1 . . . A8) for the motor vehicle (B), for determining at least one distance (d; d11, d12, d13) of the at least one key (A; A1 . . . A8) from the at least one transceiver (B1, B2, B3) owing to an estimated signal transit time (TOFestimate) between the transceiver (B1, B2, B3) and the key (A; A1 . . . A8), characterized in that said distance-determining device is embodied in such a way that in order to determine the estimated signal transit time (TOFestimate) one of the components (B1, B2; A1, A2 . . . A8) uses an indication ("X") relating to the ratio of the length of two time intervals (TRSP1, TRSP2) between, in each case, two times (FIG. 3: TS1_B, TR2_B, TR3_B; FIG. 4: TS1_B, TS2_B, TR3_B; FIG. 8: TS1_B, TR2_B, TR3_B or TS1_B, TS2_B, TR3_B) determined by another component (A1;B1) of, in each case, the transmission or reception of a message (FIG. 3: M1, M2, M3; FIG. 4: M1, M2, M3; FIG. 8: Msg-B1-all-1, Msg-A; FIG. 9: Msg-B1-all-1, Msg-B1-all-2).

Some embodiments may have at least one transceiver (B1, B2, B3) in a motor vehicle (B) for determining the distance (d; d11, d12, d13) of at least one key (A; A1 . . . A8) from the transceiver (B1, B2, B3) on the basis of an estimated signal transit time (TOFestimate) between the transceiver and the key (A; A1 . . . A8), characterized in that said distance-determining device is embodied in such a way that, in a direction (B1->A1; A1>B1) between at least one component in the form of a transceiver (B1, B2, B3) and at least one component in the form of a key (A1 . . . A8), two data items (FIG. 3: M2, M3; FIG. 4: M1, M2; FIG. 5: Msg-A1-1, Msg-A1-2; FIG. 6: Msg-B1-all-1, Msg-B1-all-2; FIG. 8: Byte 3, Byte 8; FIG. 9: Msg-B1-all-1, Msg-B1-all-2) are transmitted by one of the specified components (A1; B1) by means of at least one message (FIG. 3: M2, M3; FIG. 4: M1, M2; FIG. 5: Msg-A1-1, Msg-A1-2; FIG. 6: Msg-B1-all-1, Msg-B1-all-2; FIG. 8: Msg-B1-all-1; FIG. 9: Msg-B1-all-1, Msg-B1-all-2), which two data items are received by the other (B1; A1) of the specified components in which the times (FIG. 3: TR2_B, TR3_B; FIG. 4: TR1_A, TR2_A; FIG. 8: TR1_A; TR2_A) of the reception of the two data items (FIG. 3: M2, M3; FIG. 4: M1, M2; FIG. 5: Msg-A1-1, Msg-A1-2; FIG. 6: Msg-B1-all-1, Msg-B1-all-2; FIG. 8: Byte 3, Byte 8; FIG. 9: Msg-B1-all-1, Msg-B1-all-2) of the reception are determined, which times are used to determine the estimated signal transit time (TOFestimate), and in that, in the other direction (A1->B1; B1->A1) between at least one component in the form of a transceiver (B1, B2, B3) and at least one component in the form of a key (A1 . . . A8) one data item or two data items (FIG. 3: M1; FIG. 4: M3; FIG. 5: Msg-B1-all-1; FIG. 6: Msg-A1; FIG. 8: Byte 2, Byte 8; FIG. 9: Msg-A) are transmitted by one of the specified components (A1; B1) by means of at least one message (FIG. 3: M1; FIG. 4: M3; FIG. 5: Msg-B1-all-1; FIG. 6: Msg-A1; FIG. 8: Msg-A; FIG. 9: Msg-A1), which one or two data items are received by the other (B1; A1) of the specified components at which, in each case, the time (FIG. 3: TR1_A; FIG. 4: TR3_B; FIG. 8: TR3_B; TR4_BA) of the reception of the one or two data items (FIG. 3: M1; FIG. 4: M3; FIG. 5: Msg-B1-all-1; FIG. 6: Msg-A1; FIG. 8: Byte 2, Byte 8; FIG. 9: Msg-A) is determined and is used to determine the estimated signal transit time (TOFestimate), wherein in one direction (FIGS. 3-8) or two directions (FIG. 8) a message (FIG. 3: M1; FIG. 4: M3; FIG. 5: Msg-B1-all-1; FIG. 6: Msg-A1; FIG. 8: Msg-A; FIG. 9: Msg-A1) is transmitted by one of the specified components (A1; B1), which message contains an indication ("X") relating to two time intervals (TRSP1, TRSP2), one time interval (TRSP1, TRSP2) of which is the time difference between two messages transmitted in the one specified direction (B1->A1; A1->B1), and one time interval (TRSP1, TRSP2) of which is the time difference between a message transmitted in the one specified direction (B1->A1; A1->B1) and a message transmitted in the other specified direction (A1->B1; B1>A1), wherein an estimated signal transit time (TOFestimate) of at least one user (A1; B1) is determined with the indication ("X"; TRSP1, TRSP2; TS1_B, TR2_B, TR3_B; TS1_B, TS2_B, TR3_B) transmitted thereto, relating to two time intervals (TRSP1, TRSP2) and with times (FIG. 3: TS1_B, TR2_B, TR3_B; FIG. 4: TS1_B, TS2_B, TR3_B; FIG. 8: TS1_B, TR2_B, TR3_B or TS1_B, TS2_B, TR3_B), measured by this user (A1; B1), of the transmission and/or reception of messages (FIG. 3: M1, M2, M3; FIG. 4: M1, M2, M3; FIG. 8: Msg-B1-all-1, Msg-A; FIG. 9: Msg-B1-all-1, Msg-B1-all-2).

In some embodiments, the two data items (FIG. 3: M2, M3; FIG. 4: M1, M2; FIG. 5: Msg-A1-1, Msg-A1-2; FIG. 6: Msg-B1-all-1, Msg-B1-all-2; FIG. 9: Msg-B1-all-1, Msg-B1-all-2) transmitted by one of the specified components (A1;B1) are contained in two messages or are two messages.

In some embodiments, the two data items (FIG. 8: Byte 3, Byte 8; FIG. 8: Byte 2, Byte 8), transmitted by one of the specified components (A1; B1), are contained in a message, in particular with an indication in this message or another message as to which of the data items (Data1, Data2, Data3 . . . Data8) in a message are these two data items (FIG. 8: Byte 3, Byte 8; FIG. 8: Byte 2, Byte 8) (FIG. 8).

In some embodiments, the receiver of the message with the two data items (FIG. 8: Byte 3, Byte 8; FIG. 8: Byte 2, Byte 8) registers therein for the two data items (FIG. 8: Byte 3, Byte 8; FIG. 8: Byte 2, Byte 8) their respective reception time as a timestamp and/or uses the reception times of these two data items (FIG. 8: Byte 3, Byte 8; FIG. 8: Byte 2, Byte 8) from this message to determine a time difference with which a ratio (X) is determined which is used to determine the estimated signal transit time (TOFestimate) (FIG. 8).

In some embodiments, the indication relating to two time intervals (TRSP1, TRSP2) is or contains the ratio ("X") between two time intervals (TRSP1, TRSP2), one time interval (TRSP1, TRSP2) of which is the time difference between two messages transmitted in the one specified direction (B1->A1; A1->B1), and one time interval (TRSP1, TRSP2) of which is the time difference between a message transmitted in the one specified direction (B1->A1; A1->B1) and a message transmitted in the other specified direction (A1->B1; B1 >A1).

In some embodiments, the indication relating to two time intervals (TRSP1, TRSP2) indicates the two time intervals (TRSP1, TRSP2), one time interval (TRSP1, TRSP2) of which is the time difference between two messages transmitted in the one specified direction (B1->A1; A1 >B1), and one time interval (TRSP1, TRSP2) of which is the time difference between a message transmitted in the one specified direction (B1->A1; A1->B1) and a message transmitted in the other specified direction (A1->B1; B1>A1).

In some embodiments, the device determines the estimated signal transit time (TO¬Festimate) between a transceiver (B1 . . . B8) and a key (A; A1 . . . A8) where:

$$TOFestimate=\tfrac{1}{2}*[TR3\_B-TS1\_B-(1+X)*(TR3\_B-TR2\_B)](\text{FIG. 3, 8}).$$

In some embodiments, the device determines the estimated signal transit time (TO¬Festimate) between a transceiver (B1 . . . B8) and a key (A; A1 . . . A8) where:

$$TOFestimate=\tfrac{1}{2}*[TR3\_B-TS2\_B-(TS2\_B-TS1\_B)/X]$$
(FIG. 4, 8).

In some embodiments, the device determines the estimated signal transit time (TO¬Festimate) between a transceiver (B1 . . . B8) and a key (A; A1 . . . A8) where:

$$TOFestimate=\tfrac{1}{2}*(\tfrac{1}{2}[TR3\_B-TS1\_B-(1+X)*(TR3\_B-TR2\_B)]+\tfrac{1}{2}*[TR3\_B-TS2\_B-(TS2\_B-TS1\_B)/X])\ (\text{FIG. 8}).$$

In some embodiments, in one direction (B1->A1) at least one component in the form of a transceiver (B1, B2, B3) transmits a or precisely one message (M1) to at least one component in the form of a key (A1 . . . A8), after which in the other direction (B1->A1) at least one component in the form of a key (A1 . . . A8) transmits two messages (M2, M3) to at least one component in the form of a transceiver (B1, B2, B3). (FIG. 3).

In some embodiments, in one direction (B1->A1) two or more components, which are each in the form of a transceiver (B1, B2), each transmit a message (Msg-B1-all-1; Msg-B2-all-1 . . . Msg-Bm-all-1) to at least one component in the form of a key (A1 . . . A8), after which in the other direction (B1->A1) one or more components, which are each in the form of a key (A1 . . . A8), each transmit two messages (Msg-A1-1, Msg-A2-1 . . . MsgAk-1; Msg-A1-1, Msg-A2-1 . . . MsgAk-1, Msg-A1-1, Msg-A2-1 . . . MsgAk-1; Msg-A1-2, Msg-A2-2 . . . MsgAk-2) to at least one component in the form of a transceiver (B1, B2 . . . Bm). (FIG. 5).

In some embodiments, that in one direction (A1->B1) at least one component in the form of a transceiver (B1, B2, B3) transmits two messages (M1, M2) to at least one component in the form of a key (A1 . . . A8), after which in the other direction (A1->B1; B1->A1) at least one component in the form of a key (A1 . . . A8) transmits a or precisely one message (M3) to at least one component in the form of a transceiver (B1, B2, B3). (FIG. 4).

In some embodiments, that in one direction (B1->A1) two or more components which are each in the form of a transceiver (B1, B2) transmit two messages (Msg-B1-all-1; Msg-B2-all-1 . . . Msg-Bm-all-1, Msg-B1-all-2; Msg-B2-all-2 . . . Msg-Bm-all-2) to at least one component in the form of a key (A1 . . . A8), after which in the other direction (B1->A1) one or more components in the form of a key (A1 . . . A8) each transmit a message (Msg-A1-1, Msg-A2-1 . . . MsgAk-1; Msg-A1-1, Msg-A2-1 . . . MsgAk-1) to at least one component in the form of a transceiver (B1, B2 . . . Bm). (FIG. 5).

In some embodiments, in one direction (B1->A1) at least one component in the form of a transceiver (B1, B2, B3) transmits a or precisely one message (Msg-B1-all-1) with two specified data items (Byte 3, Byte 8) to at least one component in the form of a key (A1 . . . A8), after which in the other direction (A1->B1; B1->A1) at least one component in the form of a key (A1 . . . A8) transmits a or precisely one message (Msg-A), in particular with two further specified data items (Byte 2, Byte 8) to at least one component in the form of a transceiver (B1, B2, B3). (FIG. 8).

In some embodiments, a distance (d, d11, d12, d13) of a key (A1) from a transceiver (B1) is determined from the product of the signal propagation speed c (c-air; 299,705, 518 m/s) of electromagnetic signals in air and the estimated signal transit time TOFestimate between a key (A1) and a transceiver (B1).

Some embodiments include a method for determining the distance (d; d11, d12, d13) of a key (51; 52) from a transceiver (B1, B2, B3) in a motor vehicle (B) on the basis of an estimated signal transit time (TOFestimate) between the transceiver and the key (A; A1 . . . A8), characterized in that, in one direction (B1->A1; A1->B1) between at least one component in the form of a transceiver (B1, B2, B3) and at least one component in the form of a key (A1 . . . A8), two data items (FIG. 3: M2, M3; FIG. 4: M1, M2; FIG. 5: Msg-A1-1, Msg-A1-2; FIG. 6: Msg-B1-all-1, Msg-B1-all-2; FIG. 8: Byte 3, Byte 8; FIG. 9: Msg-B1-all-1, Msg-B1-all-2) are transmitted by one of the specified components (A1; B1) by means of at least one message (FIG. 3: M2, M3; FIG. 4: M1, M2; FIG. 5: Msg-A1-1, Msg-A1-2; FIG. 6: Msg-B1-all-1, Msg-B1-all-2; FIG. 8: Msg-B1-all-1; FIG. 9: Msg-B1-all-1, Msg-B1-all-2), which two data items are received by the other (B1; A1) of the specified components at which the times (FIG. 3: TR2_B, TR3_B; FIG. 4: TR1_A, TR2_A; FIG. 8: TR1_A; TR2_A) of the reception of the two data items (FIG. 3: M2, M3; FIG. 4: M1, M2; FIG. 5: Msg-A1-1, Msg-A1-2; FIG. 6: Msg-B1-all-1, Msg-B1-all-2; FIG. 8: Byte 3, Byte 8; FIG. 9: Msg-B1-all-1, Msg-B1-all-2) are determined, which times are used to determine the estimated signal transit time (TOFestimate) (X), and in that, in the other direction (A1->B1; B1->A1) between at least one component in the form of a transceiver (B1, B2, B3) and at least one component in the form of a key (A1 . . . A8), a data item or two data items (FIG. 3: M1; FIG. 4: M3; FIG. 5: Msg-B1-all-1; FIG. 6: Msg-A1; FIG. 8: Byte 2, Byte 8; FIG. 9: Msg-A) are transmitted by one of the specified components (A1; B1) by means of at least one message (FIG. 3: M1; FIG. 4: M3; FIG. 5: Msg-B1-all-1; FIG. 6: Msg-A1; FIG. 8: Msg-A; FIG. 9: Msg-A1), which one or two data items are received by the other (B1; A1) of the specified components at which the times (FIG. 3: TR1_A; FIG. 4: TR3_B; FIG. 8: TR3_B; TR4_BA) of the reception of the one or two data items (FIG. 3: M1; FIG. 4: M3; FIG. 5: Msg-B1-all-1; FIG. 6: Msg-A1; FIG. 8: Byte 2, Byte 8; FIG. 9: Msg-A), which are used to determine the estimated signal transit time (TOFestimate) are determined, wherein a message (FIG. 3: M1; FIG. 4: M3; FIG. 5: Msg-B1-all-1; FIG.

6: Msg-A1; FIG. 8: Msg-A; FIG. 9: Msg-A1) is transmitted by one of the specified components (A1; B1) in one direction (FIGS. 3-8) or two directions (FIG. 8), which message contains an indication of the ratio ("X") between two time intervals (TRSP1, TRSP2), one time interval (TRSP1, TRSP2) of which is the time difference between the transmission or reception of two messages transmitted in the one specified direction (B1->A1; A1->B1), and one time interval (TRSP1, TRSP2) of which is the time difference between a message transmitted in the one specified direction (B1->A1; A1->B1) and a message transmitted in the other specified direction (A1->B1; B1->A1), wherein an estimated signal transit time (TOFestimate) of at least one user (A1; B1) is determined from the indication ("X"), transmitted thereto, of the ratio of the lengths of two time intervals (TRSP1, TRSP2) and times (FIG. 3: TS1_B, TR2_B, TR3_B; FIG. 4: TS1_B, TS2_B, TR3_B; FIG. 8: TS1_B, TR2_B, TR3_B or TS1_B, TS2_B, TR3_B) measured by the user (A1;B1) of the transmission and/or reception of messages (FIG. 3: M1, M2, M3; FIG. 4: M1, M2, M3; FIG. 8: Msg-B1-all-1, MsG-A; FIG. 9: Msg-B1-all-1, Msg-B1-all-2).

BRIEF DESCRIPTION OF THE DRAWINGS

Further features and advantages of systems and methods incorporating the teachings of the present disclosure can be found in the following description of a number of exemplary embodiments with reference to the drawing. In this context, in order to illustrate a number of possible refinements of the invention, in each case in a simplifying schematic fashion.

DETAILED DESCRIPTION

Figure 1:
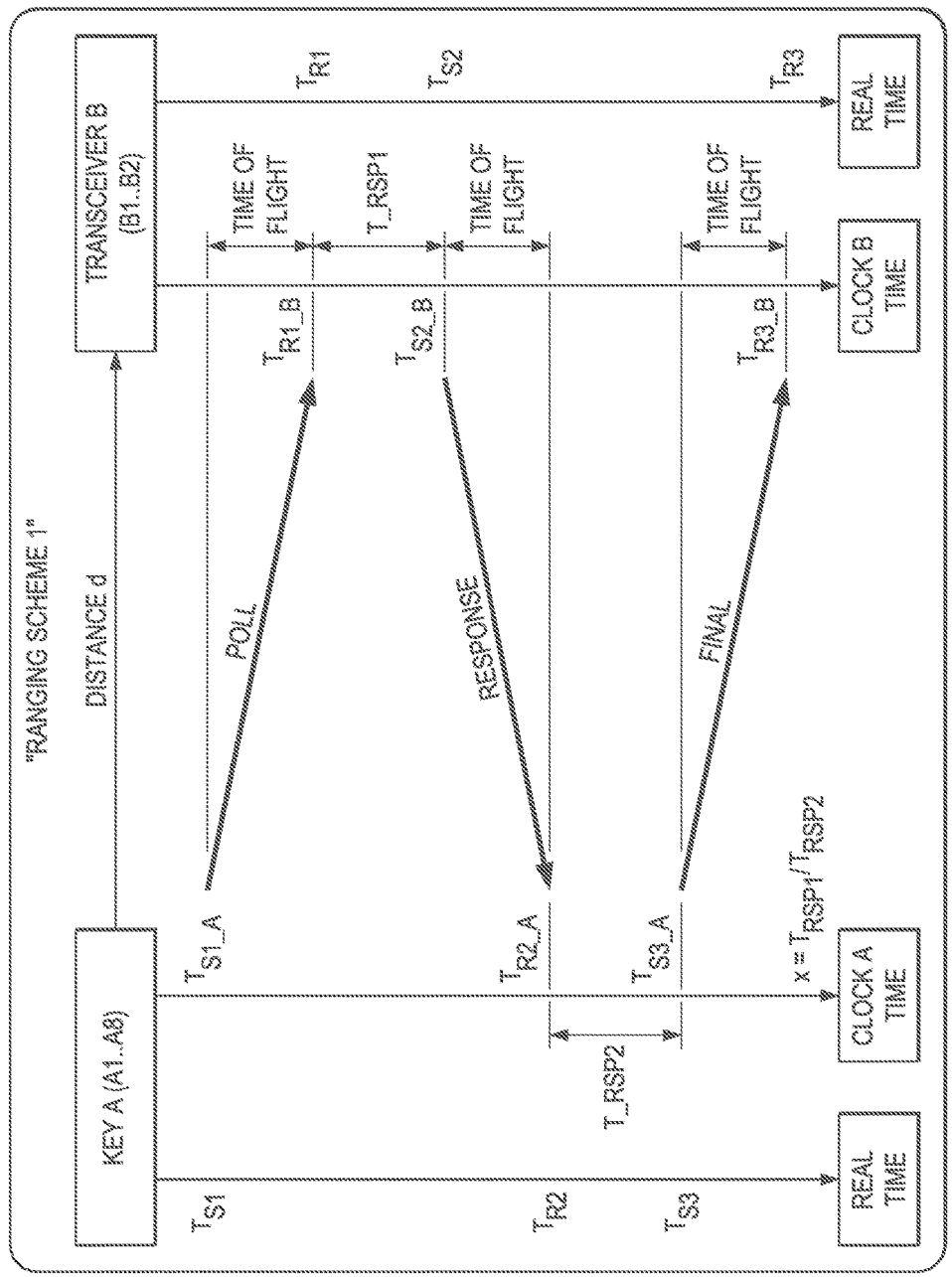
FIG. 1 shows a distance-determining method or Ranging Scheme (referred to here as "Ranging Scheme 1")

A distance measurement (=ranging with what is referred to as a ranging scheme, that is to say distance-determining method) of the distance of a key from a motor vehicle can be carried out with multiple transmission in at least one direction and one transmission in the other direction and by taking into account an indication relating to the ratio between two time differences relating to the transit time calculation and therefore distance calculation.

In some embodiments, for example a distance determination of the distance of a key from a motor vehicle can be carried out with a determination of two timestamps for the reception and/or the transmission of, in each case, a specific data item in one or more transmitted messages (or frames or transmission sequences or transmission packages).

In known UWB chips (Decawave, BeSpoon), the determination of the reception and/or transmission of a signal is triggered by the generation of one timestamp per frame at the end of the synchronization preamble according to IEEE802.14.4a.

In some embodiments, a timestamp position which is used for the ranging does not have to be known in advance and is transmitted only by a data transmission (which is cryptologically protected here). This prevents, where appropriate, the possibility of the ranging (distance determination) being manipulated by, for example, what is referred to as "Preamble Injection" in the form of targeted feeding of a (generally known) preamble signal with the objective of changing the generation of a timestamp (that is to say measurement of the time of reception of a frame at the receiver, in particular in conjunction with a "first path detection") in such a way that the signal transit time is measured to be smaller than it is in reality.

The location-determining devices B1, B2, B3 (in the motor vehicle B) can, for the determination of a distance d (=e.g. d11 or d12 or d13) of at least or of precisely one key A1 which is present (of a plurality of keys A1, A2 . . . A8 which are present here) from the respective transceiver B1, B2, B3, each transmit signals Msg-B1-W, Msg-B2-W, Msg-B1-all-1, Msg-B2-all-1, Msg-B1-all-2, Msg-B1-all-2 to keys A1, A2 . . . A8 and receive signals Msg-A1, Msg-A2 . . . Msg-A8 from keys A1, A2 . . . A8.

The distance d (=e.g. d11 or d12 or d13) of a key A from one of the location-determining devices B1, B2, B3 is determined from the product of the known electromagnetic signal propagation speed c (c in air approximately 299,705, 518 m/s, that is to say approximately =c0) of electromagnetic signals (Msg-B1-W, Msg-B2-W, Msg-B1-all-1, Msg-B2-all-1, Msg-B1-all-2, Msg-B1-all-2, Msg-A1, Msg-A2 . . . Msg-A8) in air and the signal transit time (TOF$_{estimate}$) , estimated according to refinements of the invention, between a key A and a transceiver B1 etc.—e.g. taking into account a plurality of signal transmissions here.

Methods for transit time measurement ("Ranging") are known from the literature and are applied, in particular, in conjunction with UWB transmission.

FIG. 1 shows as an example of the use of a precise absolute transit time measurement the so-called "Symmetric Double-Sided (SDS) Two-Way Ranging (TWR)", with which an offset of the reference clock between the two ranging apparatuses can be averaged. A basic precondition of the SDS-TWR is that the response times of apparatus A and apparatus B are as far as possible the same. The apparatus A (or subsequently apparatuses A1, A2 . . . A8) could be e.g. a key, and the apparatus B (or subsequently apparatuses B1, B2, B3) could be a vehicle transceiver.

Figure 2A:
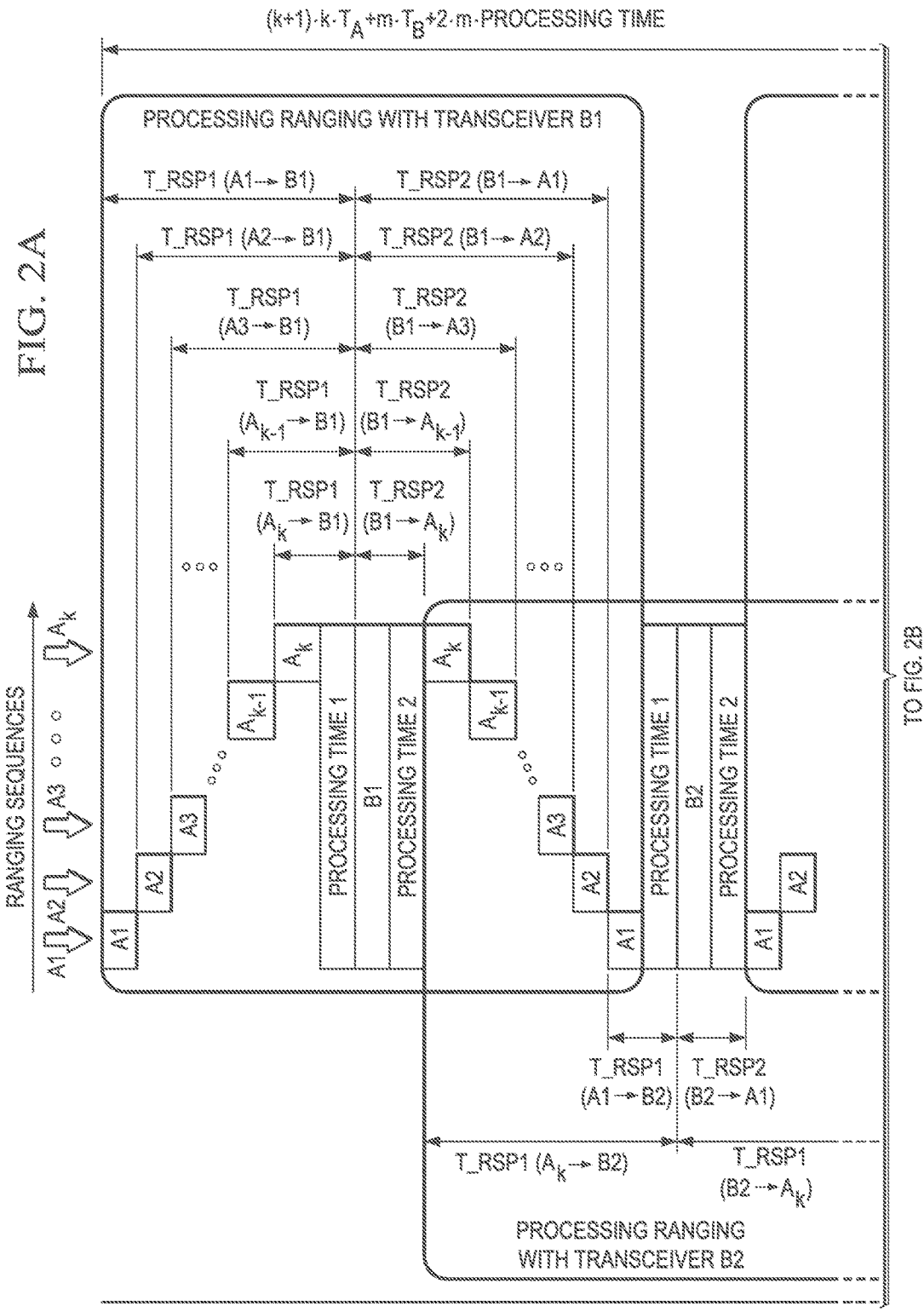
FIG. 2 shows a distance determination with what is referred to here as "limited ranging" of k apparatuses A1 . . . Ak with m apparatuses B1 . . . Bm with, for example, a "Ranging Scheme 1" as in FIG. 1.

FIG. 2 shows, for what is referred to as "Limited Ranging" of k apparatuses A1 . . . Ak with m apparatuses B1 . . . Bm with a distance-determining method "Ranging Scheme 1" as in FIG. 1, a basic problem if the "Ranging Scheme 1" (with a requirement for identical response times) is used: "Limitation" or "Interleaving" of the ranging sequences is possible only to a limited extent, and the individual distance measurements must for a large part take place successively.

Some embodiments employ alternative distance-determining methods "Ranging Scheme 2, "Ranging Scheme 3", "Ranging Scheme 4" which are illustrated by way of example in FIGS. 3-9.

A (first) possible solution element is the definition of ranging schemes (Ranging Schemes 2-4) which permit different—possibly even dynamically selectable—response times (that is to say times TRSP1, TRSP2 etc. which a transmitter or receiver (key A or motor-vehicle-side transceiver B) of a message (Frame) requires until the transmission or reception of a subsequent message).

Figure 3:
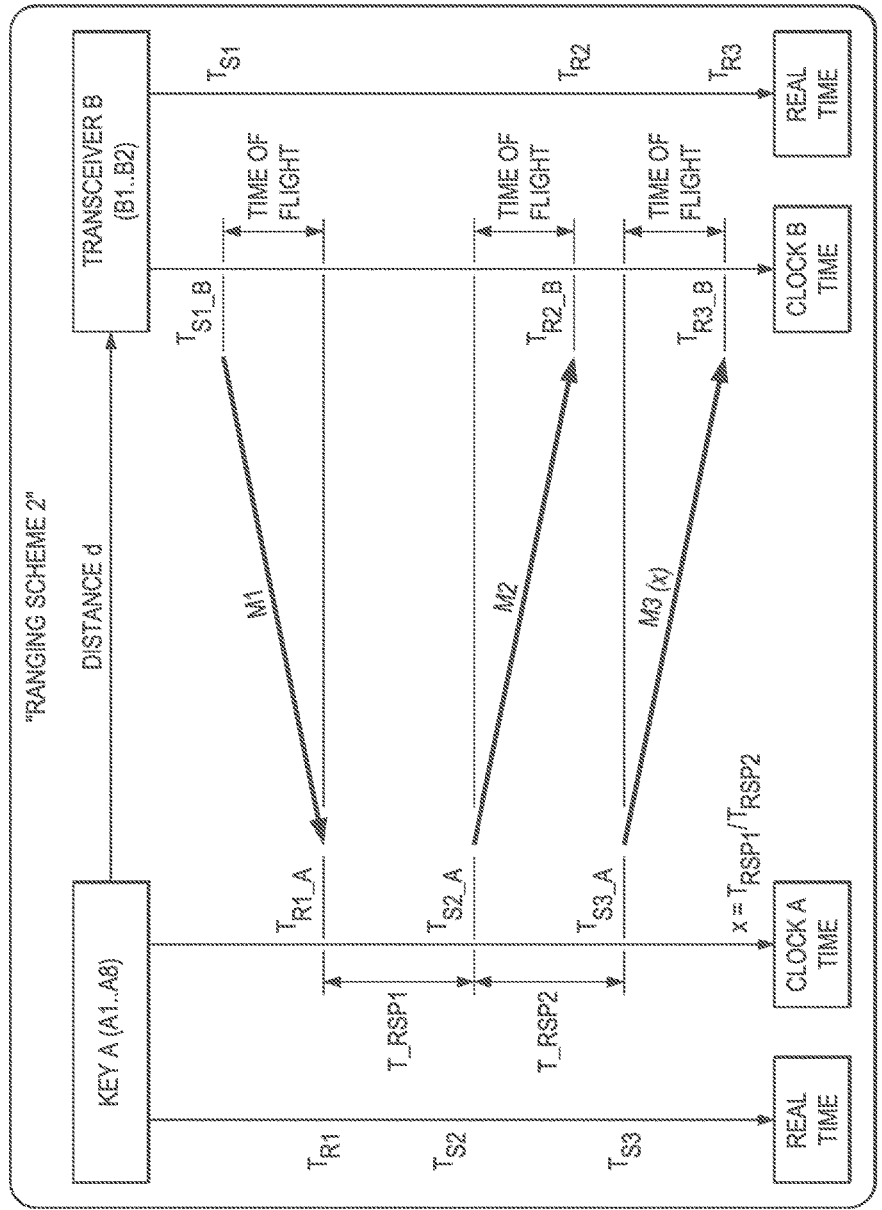
FIG. 3 shows a distance determination with what is referred to here as "Ranging Scheme 2"

FIG. 3 shows schematically what is referred to here as a distance-determining method "Ranging Scheme 2" (="Ranging Scheme 2"): A motor-vehicle-side transceiver (for example B1) transmits a message M1 once and measures, with a clock/a chip etc., at, for example, B1 the time $T_{S1\_B}$ at which it transmits the message M1 to the key A.

A motor vehicle key (e.g. A1) responds to B1 twice, specifically with messages M2 and M3 to B1 and measures with a clock/a chip etc. at A1 the time $T_{S2\_A}$ at which it transmits the message M2 to the motor-vehicle-side transceiver B1, and measures with a clock/a chip etc. at A1 the time $T_{S3\_A}$ at which it transmits the message M3 to the motor-vehicle-side transceiver B.

The response times TRSP1 and TRSP2 (that is to say times TRSP1, TRSP2 etc. which a transmitter or receiver (key A or motor-vehicle-side transceiver B) of a message (frame) requires up to the transmission or reception of a (subsequent) message) can be random here (in relative terms), e.g. only the ratio X ($X=T_{RSP1}/T_{RSP2}$) of the response times $T_{RSP1}$ and $T_{RSP2}$ (determined using a clock in the key A) (or alternatively response times $T_{RSP1}=(T_{S2\_A}-T_{R1\_A})$ and $T_{RSP2}=(T_{S3\_A}-T_{S2\_A})$ with a relatively large data length) is communicated from the key A1 to the motor-vehicle-side transceiver B1 (e.g. in a message M3).

The distance d (=e.g. d11 or d12 or d13) of a key A1 from a transceiver (e.g. B1, B2, B3) is e.g. determined from the product of the known electromagnetic signal propagation speed c (c in air approximately 299,705,518 m/s, that is to say approximately=c0) of electromagnetic signals in air and of the signal transit time $TOF_{estimate}$, estimated as below from a plurality of times, of a signal between a key A1 etc. and a location-determining device B1 etc.

This estimated signal transit time $TOF_{estimate}$ of a signal between a key A1 etc. and a location-determining device B1 etc. can be used e.g. only for distance calculations without it being relevant which of the signals or messages has this estimated signal transit time $TOF_{estimate}$.

For example, in the case of the distance-determining method 2 ("Ranging Scheme 2") in FIG. 3 the estimated signal transit time $TOF_{estimate}$ is for a signal between a key A1 and a location-determining device B1:

$$TOF_{estimate}=\tfrac{1}{2}*[T_{R3\_B}-T_{S1\_B}-(1+X)*(T_{R3\_B}-T_{R2\_B})]$$

(for the purpose of illustration: where $X=T_{RSP1}/T_{RSP2}=(T_{S2\_A}-T_{R1\_A})/(T_{S3\_A}-T_{S2\_A})$ this yields $TOF_{estimate}=\tfrac{1}{2}*[T_{R3\_B}-T_{S1\_B}-(1+(T_{S2\_A}-T_{R1\_A})/(T_{S3\_A}-T_{S2\_A}))*(T_{R3\_B}-T_{R2\_B})])$ So that in the case of the distance-determining method 2 ("Ranging Scheme 2") in FIG. 3 a motor-vehicle-side transceiver B can determine the distance d (of the key A from the motor-vehicle-side transceiver B) from an estimated transit time $TOF_{estimate}$ (TOF="Time Of Flight") between A1 and B1, the motor-vehicle-side transceiver B1 of the key A1 can therefore communicate e.g. only the ratio $X=T_{RSP1}/T_{RSP2}$ of (what are referred to here as) the response times $T_{RSP1}=(T_{S2\_A}-T_{R1\_A})$ and $T_{RSP2}=(T_{S3\_A}-T_{S2\_A})$ (measured by a clock in the key A), or as an alternative to X also the response times $T_{RSP1}=(T_{S2\_A}-T_{R1\_A})$ and $T_{RSP2}=(T_{S3\_A}-T_{S2\_A})$ with a relatively large data length), for example in the message M3 in FIG. 3; this is because the times $T_{S1\_B}$ and $T_{R2\_B}$ and $T_{R3\_B}$ can be measured by the motor-vehicle-side transceiver B1 itself with its clock ("clock B").

Figure 4:
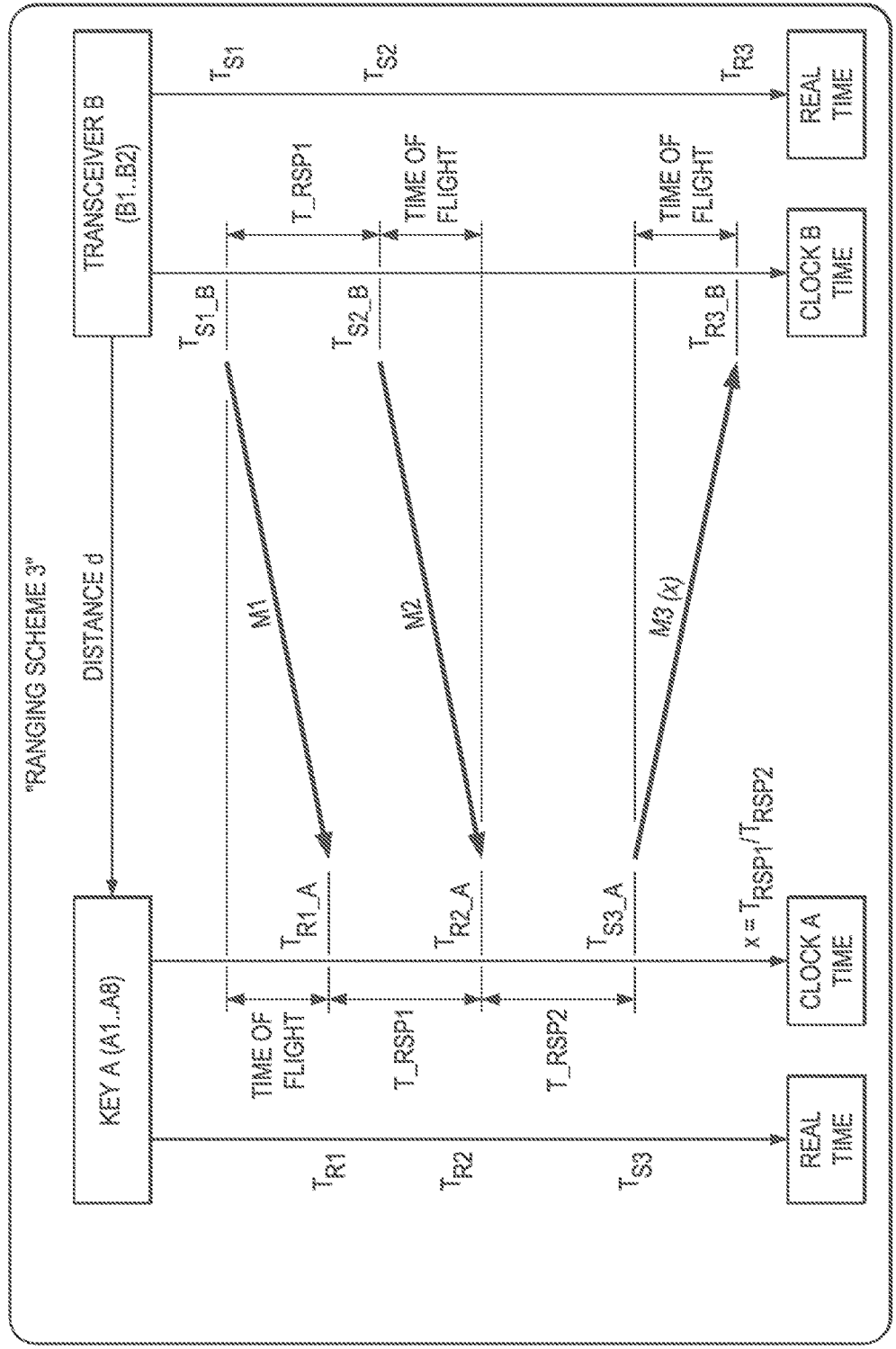
FIG. 4 shows a distance determination with what is referred to here as "Ranging Scheme 3"

FIG. 4 shows schematically what is referred to here as the distance-determining method "Ranging Scheme 3" (="Ranging Scheme 3"): A motor-vehicle-side transceiver B1 transmits twice, specifically a message M1 and a message M2, and measures with a clock/a chip etc. in B1 the time $T_{S1\_B}$, at which it transmits the message M1 to the key A, and measures with a clock/a chip etc. in B1 the time $T_{S2\_B}$, at which it transmits the message M2 to the key A.

A motor vehicle key A1 responds to B1 once, specifically with the message M3 to B1 and measures with a clock/a chip etc. at A1 the time $T_{S3\_A}$ at which it transmits the message M3 to the motor-vehicle-side transceiver B.

The response times $T_{RSP1}$ and $T_{RSP2}$ (that is to say times TRSP1, TRSP2 etc.), which (for $T_{RSP1}$) a transmitter B1 of a message at the time $T_{S1\_B}$ requires until the transmission of a (subsequent) message M2 at the time $T_{S2\_B}$ and which (for $T_{RSP2}$) a receiver A1 of a message M2 at the time $T_{R2\_A}$ requires until the transmission of a message M3 at the time $T_{S3\_A}$, can be random here (in relative terms), for example if only the ratio X of the response times TRSP1 and TRSP2 (measured with a clock in the key A1), (or alternatively instead of X response times $T_{RSP1}$ and $T_{RSP2}$ with a relatively large data length) are communicated from the key A1 to the motor-vehicle-side transceiver B1 (e.g. in a message M3).

Figure 10:
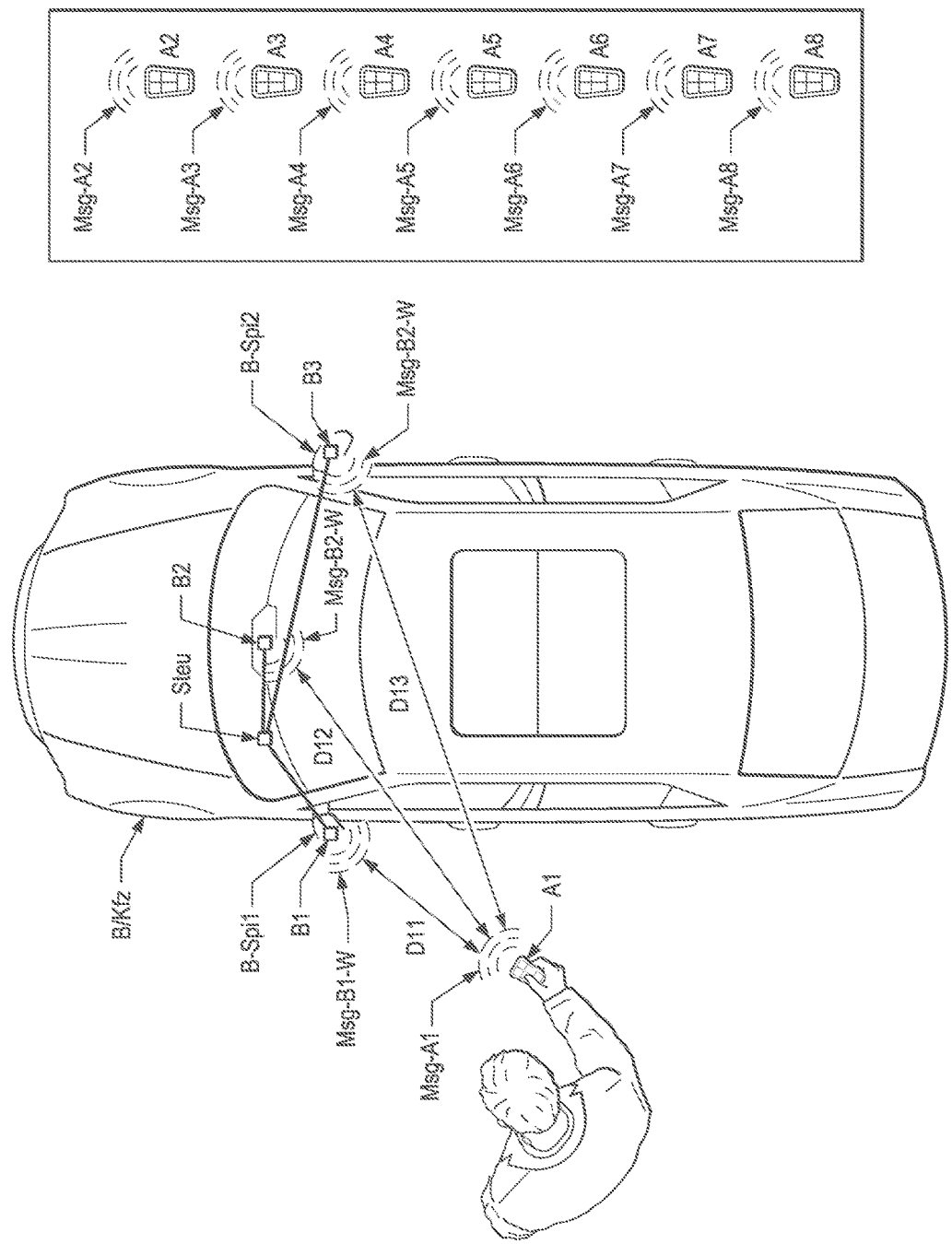
FIG. 10 shows a motor vehicle with locating devices which each have a transmitter and a receiver for determining the location of at least one key, including a motor vehicle B with location-determining devices B1, B2, B3, for example in the left-hand exterior rear-view mirror B-Spi1 and in the right-hand exterior rear-view mirror B-Spi2 and in the radio.

The distance d (=e.g. d11 or d12 or d13 in FIG. 10) of a key A to a transceiver (e.g. B1, B2, B3 in FIG. 10) is determined from the product of the known electromagnetic signal propagation speed c (c in air approximately 299,705, 518 m/s, that is to say approximately=c0) of electromagnetic signals in air and the signal transit time $TOF_{estimate}$ of a signal, estimated as follows from a plurality of times, between a key A and a location-determining device B.

For example in the case of the distance-determining method 3 ("Ranging Scheme 3") in FIG. 4 the estimated signal transit time $TOF_{estimate}$ for a signal between a key A and a location-determining device B is: $TOF_{estimate}=\tfrac{1}{2}*[T_{R3\_B}-T_{S2\_B}-(T_{S2\_B}-T_{S1\_B})/X]$ (for the purpose of illustration: where in FIG. 4: $X=T_{RSP1}/T_{RSP2}=(T_{R2\_A}-T_{R1\_A})/(T_{S3\_A}-T_{R2\_A})$ this yields $TOF_{estimate}=\tfrac{1}{2}*[T_{R3\_B}-T_{S2\_B}-(T_{S2\_B}-T_{S1\_B})/((T_{R2\_A}-T_{R1\_A})/(T_{S3\_A}-T_{R2\_A}))])$ So that in the case of the distance-determining method 3 ("Ranging Scheme 3") in FIG. 4 the motor-vehicle-side transceiver B1 can determine the distance d (of the key A1 from the motor-vehicle-side transceiver B1) from an estimated transit time $TOF_{estimate}$ (TOF="Time Of Flight") between A1 and B1, the motor-vehicle-side transceiver B1 of the key A1 can therefore communicate e.g. only the ratio $X=T_{RSP1}/T_{RSP2}$ of the response times $T_{RSP1}=(T_{R2\_A}-T_{R1\_A})$ and $T_{RSP2}=T_{S3\_A}-T_{R2\_A})$ (measured by a clock in the key A1) (or alternatively the response times $T_{RSP1}=(T_{R2\_A}-T_{R1\_A})$ and $T_{RSP2}=(T_{S3\_A}-T_{R2\_A})$ with a relatively large data length), for example in the message M3 in FIG. 4; this is because the times $T_{S1\_B}$ and $T_{S2\_B}$ and $T_{R3\_B}$ can be measured by the motor-vehicle-side transceiver B1 itself with its clock ("clock B").

Figure 5:
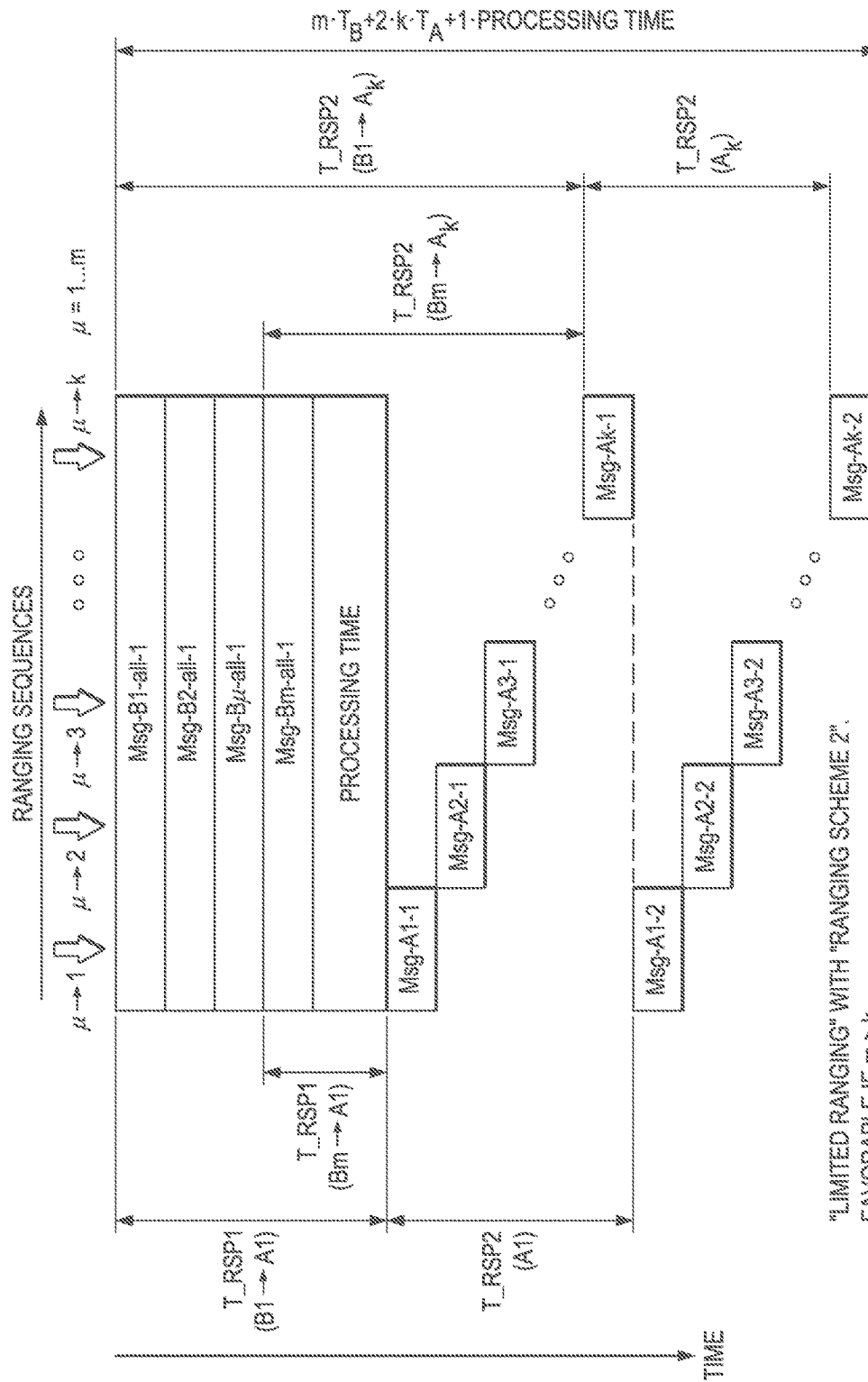
FIG. 5 shows a distance determination with what is referred to here as "Limited Ranging" with, for example, the "Ranging Scheme 2", in particular for m>k (more(m) motor-vehicle-side transceivers B than (k) motor vehicle keys A)
Figure 6:
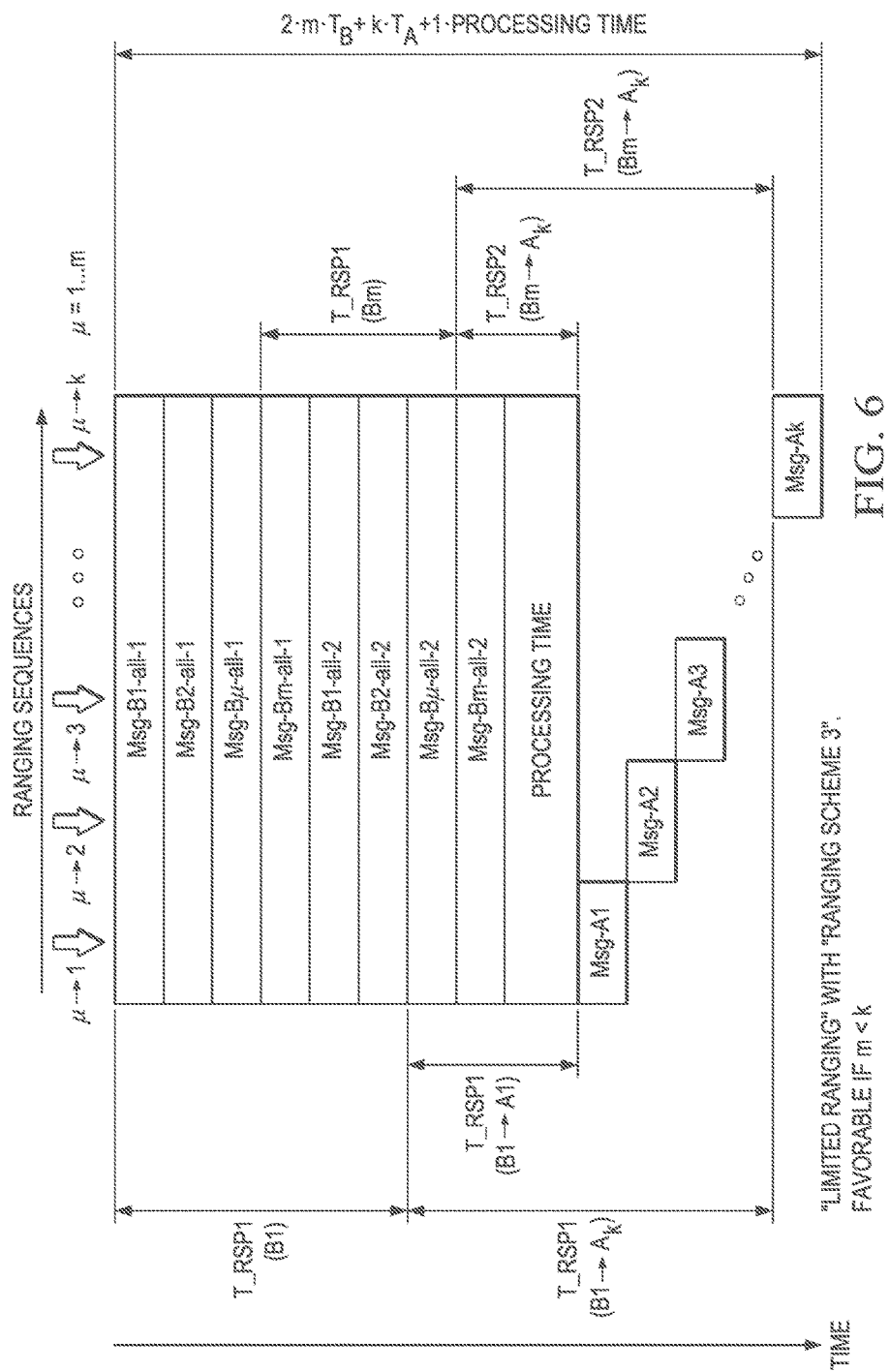
FIG. 6 shows a distance determination with what is referred to here as "Limited Ranging" with a "Ranging Scheme 3", in particular for m<k (fewer (m) motor-vehicle-side transceivers B than (k) motor vehicle keys A)

FIG. 5 and FIG. 6 each show an example of a ranging sequence (determination of distance) with a plurality of apparatuses A1 ... Ak, B1 ... Bm.

A second solution element of a number of refinements of the invention can relate to the definition of a sequence for the measurement of distance between a plurality of apparatuses, which sequence is based on the fact that a message (in FIG. 5: A1, A2, A3 ... $A_k$) of one of the (k) A apparatuses can be used by all the (m) B apparatuses for the ranging, and vice versa (in FIG. 5: B1, B2, B3 ... $B_m$).

In this context, the following applies with respect to the duration or the assignment of the transmission channel:

If there are more B apparatuses than A apparatuses in the system, the Ranging Scheme 2 may be appropriate.

If there are more A apparatuses than B apparatuses in the system, the Ranging Scheme 3 may be appropriate.

If there are precisely as many A apparatuses as B apparatuses in the system, both schemes may be appropriate, wherein owing to the number of timestamps to be transmitted from A to B, a small advantage may be produced for the Ranging Scheme 2 (there are fewer reception timestamps to transmit, which can be perceptible in the packet length—one timestamp can easily be several bytes long).

FIG. 5 shows "Limited Ranging" of k apparatuses A1 ... Ak with m apparatuses B1 ... Bm with "Ranging Scheme 2" which is, in particular, favorable if m>k.

The m B apparatuses successively start the ranging.

Since all the A apparatuses can receive the messages from the B apparatuses, the ranging with all the A apparatuses A1 ... A8 starts with every first B message (Msg-B1-all-1 ... Msg-Bm-all-1).

Example:
The B1 message Msg-B1-all-1 of B1 starts ranging with all A apparatuses, that is to say (μ=1) 1→1, 1→2, 1→3 ....
The B2 message Msg-B2-all-1 of B2 starts ranging with all A apparatuses, that is to say (μ=2) 2→1, 2→2, 2→3 ....

The B apparatuses B1 ... Bm each generate here a transmission timestamp during the transmission of a message Msg-B1-all-1 ... Msg-Bm-all-1.

Each A apparatus A1 ... Ak generates a reception timestamp during the reception of a message Msg-B1-all-1 ... Msg-Bm-all-1 which is dependent on the respective signal transit time and the individual path difference and offset of the A clock. Overall, m reception timestamps therefore occur for each A apparatus.

The A apparatuses respond with response times which are offset by one frame length, in order to avoid signal collisions.

This response time $T_{RSP1}$ can be calculated according to a previously defined pattern:

$$T_{RSP1}=m*T_B +T_{processing}+(\kappa-1)*T_A \text{ where } \kappa=1 \ldots k$$

Variations in the response time are possible, e.g. additional pause times between the A frames with a random offset of the transmission time in order to make falsification more difficult.

During the transmission of a message Msg-A1-1 ... MsgAk-2 each A apparatus generates one transmission timestamp.

Each B apparatus successively receives messages Msg-A1-1 ... MsgAk-2 of the A apparatuses and generates in each case one reception timestamp here.

Example:
B1 receives Msg-A1-1 from A1 and generates a timestamp $T_{A1.1}$ (B1)
B1 receives MsgA2-1 from A2 and generates a timestamp $T_{A2.1}$ (B1)
...
B2 receives Msg-A1-1 from A1 and generates a timestamp $T_{A1.1}$(B2)
...

After the first message Msg-Ak-1 of the k-th A apparatus is concluded, the A apparatuses transmit a second time in order to complete the ranging scheme 2. The messages Msg-A1-2 ... Msg-Ak-2 are again offset by one frame length in order to avoid signal collisions.

The following rule can be used for the response time $T_{RSP2}$ here:

$$T_{RSP2}=k*T_A$$

The response times $T_{RSP1}$ and $T_{RSP2}$ are generally not the same here.

The ratio $X=T_{RSP1}/T_{RSP2}$ is different for each A apparatus.

During the transmission each A apparatus generates a transmission timestamp.

Each B apparatus successively receives the messages Msg-A1-2 ... Msg-Ak-2 of the A apparatuses and generates in each case a reception timestamp here.

The reception and transmission timestamps generated by the A apparatuses (or in each case an indication "X" relating to a ratio between the lengths of two time intervals ($T_{RSP1}$, $T_{RSP2}$) between, in each case, two times, measured by the A apparatuses (A1-A8), of, in each case, transmission or reception of a message are integrated into the A messages (e.g. Msg-A1-1 and/or Msg-A1-2 etc.) and are therefore available to the B apparatuses.

In practice this takes place together with the ranging messages.

Transmission timestamps can be integrated into the message to be transmitted if the hardware (IC) has the capability of starting the transmission process at a previously configured time.

Example:
The first A message contains the m reception timestamps of all the B messages and the transmission timestamp of this first A message.
The second A message contains the transmission timestamp of this second A message.

Example: m=8, k=8
The first A message contains 8+1=9 timestamps
The second A message contains 1 timestamp
In total, 24 messages are transmitted (8 from B to A, 16 from A to B), where 10 timestamps have to be included.

Each B apparatus therefore has its own transmission timestamp ($T_{S1\_B}$), 2*k reception timestamps of the A messages ($T_{R2\_B}$ and $T_{R3\_B}$) as well as k reception timestamps ($T_{R1\_A}$) and 2*k transmission timestamps ($T_{S2\_A}$ and $T_{S3\_A}$) of the A apparatuses and can therefore calculate the transit times or distances from all the A apparatuses.

$$X=T_{RSP1}/T_{RSP2}=T_{RSP1\_A}/T_{RSP2\_A}=(T_{S2\_A}-T_{R1\_A})/(T_{S3\_A}-T_{S2\_A})$$

$$TOF_{estimate}=TOF_B=\frac{1}{2} \cdot [T_{R3\_B}-T_{S1\_B}-(1+X)\cdot(T_{R3\_B}-T_{R2\_B})$$

FIG. 6 shows "Limited Ranging" of k apparatuses A1 . . . Ak with m apparatuses B1 . . . Bm with "Ranging Scheme 2", which is, in particular, favorable if m<k.

The m B apparatuses successively start ranging.
  Since all the A apparatuses can receive the messages from the B apparatuses, the ranging with all the A apparatuses A1 . . . Ak starts with each first B message Msg-B1-all-1 . . . Msg-Bm-all-1.
  Example:
  The B1 message Msg-B1-1 starts ranging with all the A apparatuses, that is to say (μ=1) 1→1, 1→2, 1→3 . . . .
  The B2 message Msg-B2-1 starts ranging with all the A apparatuses, that is to say (μ=2) 2→1, 2→2, 2→3 . . . .
The B apparatuses each generate here a transmission timestamp during the transmission of a message Msg-B1-all-1 . . . Msg-Bm-all-1.
Each A apparatus generates a reception timestamp during the reception of a message Msg-B1-all-1 . . . Msg-Bm-all-1 which is dependent on the respective signal transit time and the individual path difference and offset of the A clock. Overall, m reception timestamps therefore occur for each A apparatus.
After the last B apparatus has concluded the first ranging message, the B apparatuses transmit a second time (2nd message in the Ranging Scheme 3) messages during the transmission of a message Msg-B1-all-2 . . . Msg-Bm-all-2.
The response time $T_{RSP1}$ can be defined as follows:

$$T_{RSP1} = m * T_B$$

Variations of the response time are possible, e.g. by means of additional pause times or a random offset of the transmission time in order to make falsification more difficult.
  During the transmission of a message Msg-B1-all-2 . . . Msg-Bm-all-2 each B apparatus generates a transmission timestamp again.
  Each A apparatus receives the message Msg-B1-all-2 . . . Msg-Bm-all-2 and generates a (second) individual reception timestamp here.
After the second ranging message has also been concluded by the m-th B apparatus, the A apparatuses respond once with Msg-A1 . . . Msg-Ak, in order to complete the ranging scheme.
  A brief calculation time ("Processing Time") has to be reserved so that the first A apparatus (A1) can process the message of the last B apparatus ($B_m$).
  For the response time $T_{RSP2}$ the following rule can be applied:

$$T_{RSP2} = m*T_B + T_{processing} + (\kappa-1)*T_A \text{ where } \kappa = 1 \ldots k$$

The response times $T_{RSP1}$ and $T_{RSP2}$ are generally not the same here.
  The ratio $x = T_{RSP1}/T_{RSP2}$ is different for each A apparatus.
  During the transmission each A apparatus generates a transmission timestamp.
  Each B apparatus successively receives the messages Msg-A1 . . . Msg-Ak of the A apparatuses and generates in each case a reception timestamp here.
The reception and transmission timestamps generated by the A apparatuses are integrated into the A messages Msg-A1 . . . Msg-Ak and are therefore available to the B apparatuses.
  In practice, this takes place together with the ranging messages.
  Transmission timestamps can be integrated into the message to be transmitted if the hardware (IC) has the capability of starting the transmission process at a previously configured time.
  Example:
  The A message contains the 2*m reception timestamps of all the B messages and the transmission timestamp of this concluding A message.
  Example: m=8, k=8
  The A message contains 2*8+1=17 timestamps.
  In total, 24 messages are therefore transmitted (16 from B to A, 8 from A to B), where 17 timestamps are to be included.
Each B apparatus therefore has its own transmission timestamps ($T_{S1\_B}$, $T_{S2\_B}$), k reception timestamps of the A messages ($T_{R3\_B}$) and 2*m reception timestamps ($T_{R2\_A}$, $T_{R2\_A}$) and k transmission timestamps ($T_{S3\_A}$) of the A apparatuses and can therefore calculate the transit times for or distances from all the A apparatuses.

$$X = T_{RSP1}/T_{RSP2} = T_{RSP1\_A}/T_{RSP2\_A} = (T_{R2\_A} - T_{R1\_A})/(T_{S3\_A} - T_{R2\_A})$$

$$TOF_{estimate} = TOF_B = \frac{1}{2} \cdot [T_{R3\_B} - T_{S2\_B} - (T_{S2\_B} - T_{S1\_B})/X]$$

Figure 7:
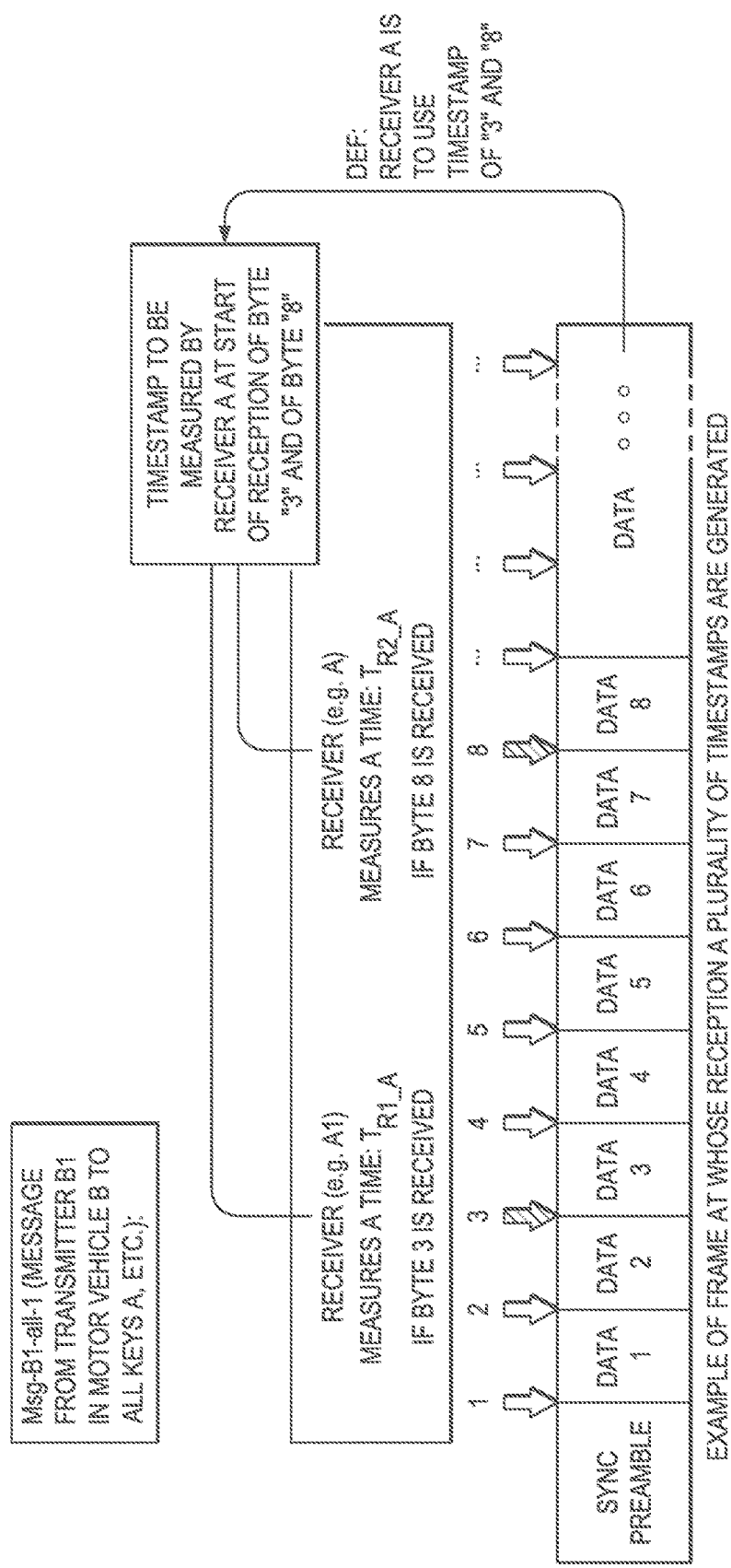
FIG. 7 shows an example of a frame, on whose reception by the receiver a plurality of timestamps are generated and used further at data such as data bytes Nos. 3 and 8 which are specified in the frame (if appropriate in an encrypted form)
Figure 8:
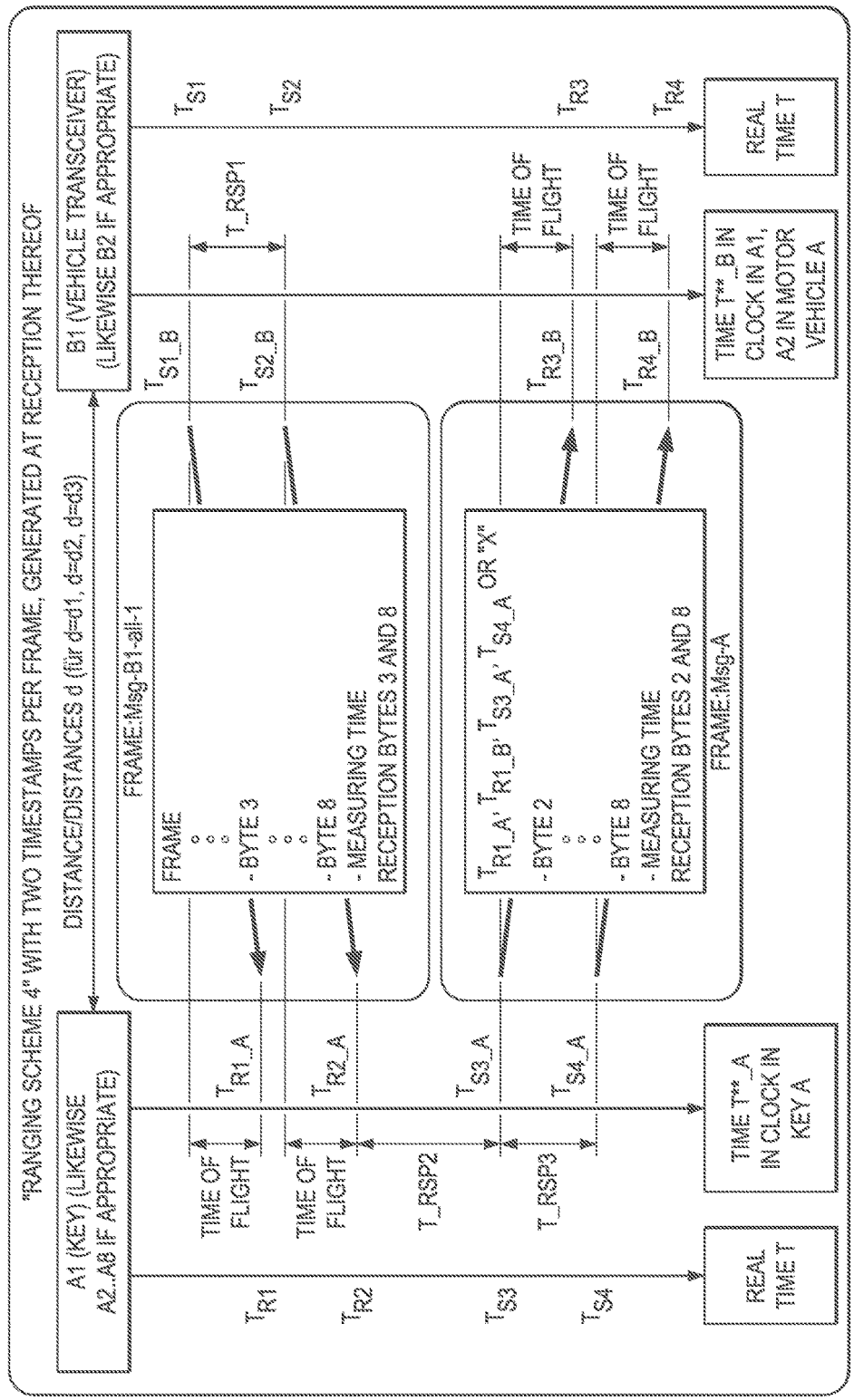
FIG. 8 shows what is referred to here as "Ranging Scheme 4" with, in each case, two timestamps per frame which are generated at the reception of a frame (of the two frames which are illustrated) by the receiver.

As shown in FIG. 7 and FIG. 8, some of the teachings relate to the use of a plurality of (here at least two) timestamps per message transmitted between A and B (=referred to here as frame). Conventional UWB chipsets (Decawave, BeSpoon) generate one timestamp per frame, usually at the end of the synchronization preamble. The timestamp position is defined precisely e.g. in the IEEE802.15.4a protocol and is therefore known a priori.

There are several reasons for configuring a system in such a way that the timestamp position which is used for the ranging is not known in advance and is only communicated ("a posteriori") by the (cryptologically protected) data transmission. This avoids e.g. the possibility of the ranging being manipulated by what is referred to as "Preamble Injection", that is to say by selectively feeding in a (generally known) preamble signal with the objective of changing the generation of timestamps (specifically in conjunction with "first path detection") in such a way that the signal transit time is measured as being smaller than it is in reality.

This requires receiver path signal processing which is also capable of generating timestamps within the data. In some embodiments, one timestamp is generated per received data byte and the timestamp or timestamps to be used is/are transmitted only with the data.

FIG. 7 shows an example of a frame (e.g. Msg-B1-all-1), in which a plurality of timestamps (in each case during the reception of, in each case, one data item or byte (here byte or data item (data) No. 3 and No. 8 in the frame) of a frame during the reception of the frame) are generated.

FIG. 7 illustrates how, for all the data units (or alternatively e.g. also or only for each data byte Data1 . . . Data8), a timestamp is generated by a clock or a chip of a receiver (e.g. A1 and/or B1) of a message (such as M1, M2, M3), and subsequently two timestamps (timestamp $T_{R1\_A}$ for the data item or Byte 3 and timestamp $T_{R2\_A}$ for the data item or Byte 8) are selected for further processing.

If two (or more) timestamps (timestamp $T_{R1\_A}$ for the data item or Byte 3 and timestamp $T_{R2\_A}$ for the data item or Byte 8) can then be generated and/or further processed per frame, even more efficient ranging schemes can be defined (the previous schemes in FIGS. 2-7 could imply that the transmission of a frame is provided for each timestamp).

A simple possibility is (as illustrated above in FIG. 8) to transmit just one frame from A1 to B1 and (as illustrated below in FIG. 8) one frame from B1 to A1, at the reception of which (for the upper frame in A or for the lower frame in B) in each case two timestamps are generated or further processed (e.g. timestamp $T_{R1\_A}$ for the data item or Byte 3 and timestamp $T_{R2\_A}$ for the data item or Byte 8 at the reception of the first frame in A).

There is now more ranging information (=timestamps) available, accompanied by simultaneously reduced transmission expenditure or spectrum assignment.

The scheme as shown in FIG. 8 can be considered e.g. to be a mixture of the Ranging Scheme 2 and of the Ranging Scheme 3. For example, the TOFestimate could be calculated once according to Scheme 2 and once according to Scheme 3, and the two results could be averaged in order to minimize the error. Other calculation methods with the objective of minimizing errors are conceivable.

Figure 9:
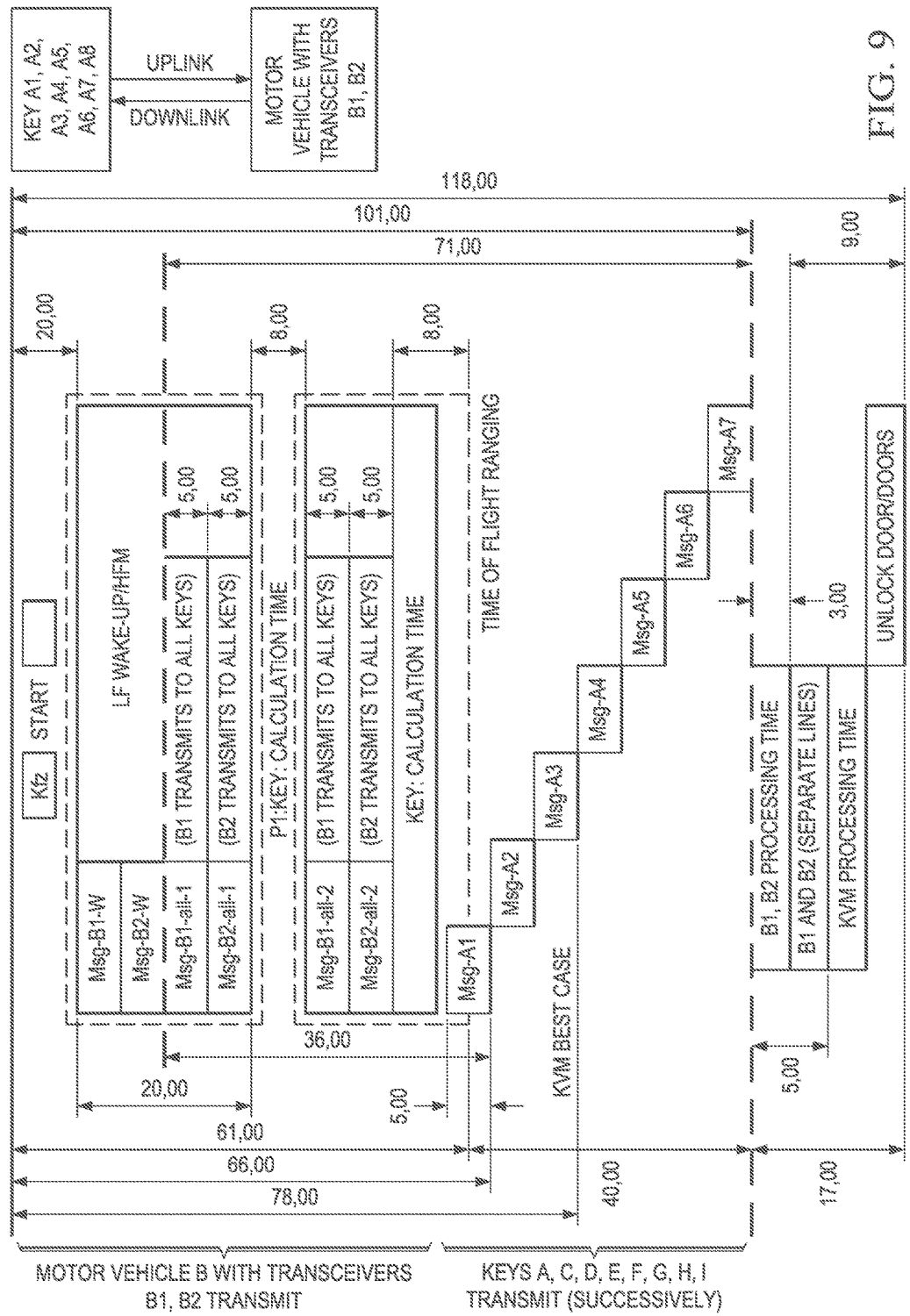
FIG. 9 shows an example of an LF/UWB-based PASE sequence.

As is clarified by way of example by FIG. 9 with respect to a sequence in an LF-UWB-based PASE system, further refinements of the invention relate to the application of the "Ranging Scheme 3" for the communication sequence in a PASE ("Passive Start and Entry") system with one or more (here eight) keys A1, A2 . . . A7 and e.g. one or more (here two) vehicle transceivers B1, B2 of a motor vehicle B.

One possible LF/UWB-based PASE sequence is as follows:

The sequence is started by an external action (pulling on door handle or recognition of approaching by means of a proximity sensor or polling function).

After the vehicle electronics have been powered up, the vehicle B (that is to say B1 etc.) transmits at least one LF signal Msg-B1-W, Msg-B2-W in order to wake up the at least one key A (A1, A2 . . . A7) (possibly by means of power-saving LF receiver in the at least one key e A1, A2 . . . A7 which is continuously active), and to measure the LF field strength (in the key A1, A2 . . . A7), (if appropriate of various LF vehicle antennas).

Even during the LF transmission phase, the two UWB vehicle transceivers B1, B2 could start the ranging (=distance measurement), e.g. according to the principle in FIG. 3 or 4 or 8.

A pause P1 is inserted between the respective first ranging message Msg-B1-all-1, Msg-B2-all-1 of the vehicle transceivers B1, B2 and the second ranging message Msg-B1-all-2, Msg-B2-all-2, in order to give the keys A1, A2 . . . A7 an opportunity to process and interpret the received data (in Msg-B1-all-1, Msg-B2-all-1, Msg-B1-all-2, Msg-B2-all-2 and, if appropriate, correspondingly M1/M1, M2 in the other figs).

The first ranging message Msg-B1-all-1 conveniently already contains a "Challenge" for a cryptological "Challenge Response" method After the second ranging message (and, if appropriate, pause time) some (here seven) of the plurality (e.g. here eight) of keys A1, A2 . . . A7 successively respond (with Msg-A1, Msg-A2, Msg-A3, Msg-A4, Msg-A5, Msg-A6, Msg-A7) and integrate into the data (with Msg-A1, Msg-A2, Msg-A3, Msg-A4, Msg-A5, Msg-A6, Msg-A7)

the reception timestamps (e.g. corresponding to $T_{R1\_A}$, $T_{R2\_A}$ in FIG. 4) which they have respectively produced (with their clocks/chips) when they received data (with messages Msg-B1-all-1, Msg-B2-all-1, Msg-B1-all-2, Msg-B2-all-2) from the two motor-vehicle-side transceivers B1, B2, the cryptological "Response" of the keys A1, A2, . . . A7 to the vehicle transceivers B1, B2, and the measured LF-RSSI data.

Since the keys A1, A2 . . . A7 of both transceivers B1, B2 can be received, the complete data of all seven or eight keys (LF-RSSI, cryptology, ranging) are therefore available on the vehicle side (B).

The transceivers B1, B2 already start to transmit the received data or information generated therefrom to a control apparatus Steu after the reception of a message Msg-A1 of the first key A1.

After the conclusion of the ranging with all the keys A1 . . . A7, e.g. seven or eight thereof, the control apparatus Steu therefore has all the information necessary to determine the distances of all the keys A1 . . . A7 from the motor vehicle and the decision freedom for each of these keys A1 . . . A7 to ensure or reject vehicle access for said key.

For this purpose, the information items can also be plausibility-checked against one another or logically linked to one another.

Possible technical advantages of these teachings may include:

Faster reaction time

Smaller spectrum assignment and

Lower energy requirement

On the B-side, the totality of all the information is available.

In particular if the B apparatuses (B1, B2 etc.) are interlinked (vehicle), the information can be used for further signal processing or merging (e.g. plausibility checking of the measured distances)

Further embodiments may include:

Method for transit-time-based distance measurement ("Ranging") during which a plurality of successive timestamps (e.g. at minimum two) are generated in one transmission direction, either by multiple transmission or by corresponding signal processing within one frame.

Method for ranging between a plurality of apparatuses, in which method different apparatuses relate to one and the same message of another apparatus, as a result of which efficient (chronological) interleaving of the ranging sequences is made possible.

Interleaving the ranging sequences in the frequency dimension (FDMA) or code dimension (CDMA).

A distance d can be used e.g. to permit just one key A1 which is located close enough (e.g. less than 1 m or 2 m) to the motor vehicle B to open a door of the motor vehicle B and/or to permit an engine start.

A distance determination can be used e.g. to reliably determine the distance d of a key A1 from at least one motor vehicle transceiver B1, in order to counteract unauthorized opening attempts by third parties by means of networks intermediately connected between the motor-vehicle-side transceiver B1 and the key A1, so that the simulation of a close distance would be avoided.

The invention claimed is:

1. A system for detecting the distance between a vehicle and a key associated with the vehicle, the system comprising:

a transceiver associated with the vehicle;

the key; and wherein either the transceiver or the key transmits two data items to the other of the transceiver and the key;

wherein the first of the two data items comprises information relating to a first time interval indicating a time difference between transmission of two previously transmitted messages and the second of the two data items comprises information relating to a second time interval indicating a time difference between reception of the two previously transmitted messages; and a processor configured to calculate an estimated signal transit time between the transceiver and the key based at least in part on a ratio of a length of the two time intervals;

wherein the processor estimates the signal transit time based at least in part on the determined times and transmits the estimated signal transit time to either the transceiver or the key; and the processor calculates a distance between the vehicle and the key based on the estimated signal transit time.

2. The system as claimed in claim 1, wherein the two data items are transmitted in two separate messages.

3. The system as claimed in claim 1, wherein a first message includes an indication of the data items among additional data items in the first message.

4. The system as claimed in claim 3, wherein the processor registers a timestamp indicating the respective reception time for each of the two data items or uses the respective reception times of these two data items to determine a ratio between the time differences to determine the estimated signal transit time.

5. The system as claimed in claim 1, wherein the two time intervals include one time interval indicating a time difference between two messages transmitted in a first direction, and a second time interval indicating a time difference between two messages transmitted in opposite directions.

6. The system as claimed in claim 1, wherein the two time intervals include a first time interval indicating a time difference between two messages transmitted in a first direction, and a second time interval indicating a time difference two messages transmitted in opposite directions.

7. The system as claimed in claim 1, wherein the estimated signal transit time between a transceiver and a key is calculated based on:

$$TOFestimate=½*[TR3\_B-TS1\_B-(1+X)*(TR3\_B-TR2\_B)];$$

wherein:
TR3_B indicates a time a third message was received;
TS1_B indicates a time a first message was sent;
TR3_B indicates a time the third message was received;
TR2_B indicates a time a second message was received; and
X indicates the ratio of the two time intervals.

8. The system as claimed in claim 1, wherein the estimated signal transit time is calculated using:

$$TOFestimate=½*[TR3\_B-TS2\_B-(TS2\_B-TS1\_B)/X]$$

wherein:
TR3_B indicates a time a third message was received;
TS2_B indicates a time a second message was sent;
TS1_B indicates a time a first message was sent; and
X indicates the ratio of the two time intervals.

9. The system as claimed in claim 1, the estimated signal transit time is calculated using:

$$TOFestimate=½*(½*[TR3\_B-TS1\_B-(1+X)*(TR3\_B-TR2\_B)]+½*[TR3\_B-TS2\_B-(TS2\_B-TS1\_B)/X])$$

wherein:
TR3_B indicates a time a third message was received;
TS1_B indicates a time a first message was sent;
X indicates the ratio of the two time intervals;
TR2_B indicates a time a second message was received; and
TS2_B indicates a time the second message was sent.

10. The system as claimed in claim 1, wherein the transceiver transmits precisely one message to the key, and after which the key transmits two messages to the transceiver.

11. The system as claimed in claim 1, further comprising two transceivers, each transceiver transmitting a message to the key, after which the key transmits two messages to at least one transceiver.

12. The system as claimed in claim 1, wherein the transceiver transmits two messages to the key, after which the key transmits a message to the transceiver.

13. The system as claimed in claim 1, further comprising two transceivers, each transceiver transmitting two messages to the key, after which the key transmits a message to at least one transceiver.

14. The system as claimed in claim 1, wherein the transceiver transmits a message with two specified data items to the key, after which the key transmits a message, with two further specified data items to the transceiver.

15. The system as claimed in claim 1, wherein the distance of the key from the transceiver is determined based at least in part on a product of signal propagation speed of electromagnetic signals in air and the estimated signal transit time TOFestimate between the key and the transceiver.

16. A method for determining the distance of a key from a transceiver in a motor vehicle on the basis of an estimated signal transit time between the transceiver and the key, the method comprising:

transmitting two data items in a first direction from one of the transceiver and the key to the other of the transceiver and the key;

receiving the two data items and determining reception times for each of the two data items;

using the respective reception times to determine the estimated signal transit time;

transmitting a message in return including an indication of the ratio between a first time interval and a second time interval;

the first time interval indicating a time difference between the transmission or reception of the two data items transmitted in the first direction, and the second time interval indicating a time difference between two additional data items transmitted in a second direction opposite to the first direction;

wherein an estimated signal transit time of at least one user is determined from the indication, transmitted thereto, of the ratio of the lengths of two time intervals and times measured; and calculating a distance between the vehicle and the key based on the estimated signal transit time.

* * * * *